INVENTOR.
HUGH A. ZINDLER
BY
Wheeler, Wheeler & Wheeler
ATTORNEYS

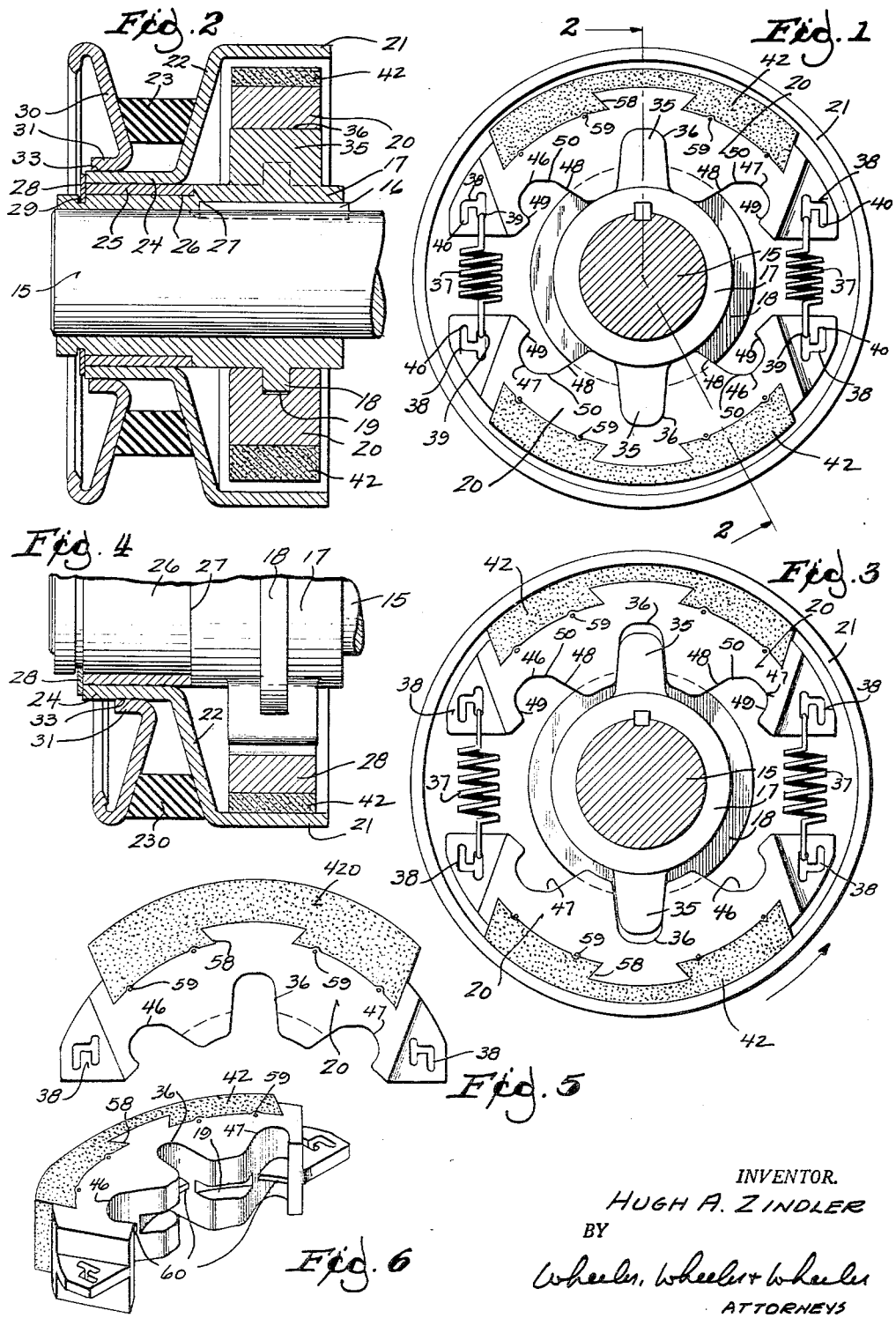

United States Patent Office 2,942,711
Patented June 28, 1960

2,942,711

CENTRIFUGAL AND CAMMING CLUTCH AND PULLEY

Hugh A. Zindler, Rte. 1, Box 107, Cedarburg, Wis.

Filed May 18, 1956, Ser. No. 585,730

5 Claims. (Cl. 192—105)

This invention relates to a centrifugal and camming clutch and pulley.

A plurality of clutch shoes within a drum portion of a pulley of adjustable width are connected by springs to each other to draw their respective linings out of contact with the drum.

The shoes have camming and guiding surfaces and the driving shaft has a hub provided with arms selectively engageable with portions of such surfaces which vary in form and location according to the clutching effect desired. With the radial arms of the hub engaged in corresponding notches at the centers of the respective shoes, the device will function as a centrifugal clutch, engagement of the shoes with the drum being determined solely by centrifugal force.

If, in the assembly of the parts, the arms on the driving hub are engaged with camming surfaces of the shoes near the trailing ends of the respective shoes, the clutch will be quick acting and capable of transmitting high torque because of the camming action.

If, on the other hand, the arms of the driving hub are engaged with notches in the shoes near their leading ends, the shoes will pivot outwardly with respect to the driving arms, producing a relatively soft or smooth acting clutch.

As examples of different modifications contemplated, I may provide the shoes with removable webs temporarily closing some or all of the notches with which the arms on the driving hub are engaged, whereby to guide an inexperienced operator in the correct assembly of the parts; I may adapt the shoes for cooperation with a larger driving drum by simply increasing the thickness of the lining insert carried by the respective shoes; I may use special and non-radial arms either separately or in conjunction with radial arms on the driving hub and achieve special effects by reversing such hubs on the driving shaft; I may provide for the connection of springs to the shoes at various points in order to vary the effect of the springs on the action of the clutch; and I may vary the size of the driven pulley to accommodate belts of different width for change of the radius at which a given belt will operate by the manner in which the pulley parts are assembled.

In the drawings:

Fig. 1 is a view in end elevation of a clutch embodying the invention.

Fig. 2 is a view taken in section on the line 2—2 of Fig. 1.

Fig. 3 is a view similar to Fig. 1 showing the clutch shoes engaged centrifugally with the driven drum.

Fig. 4 is a fragmentary view similar to Fig. 2 showing a shoe engaged as in Fig. 3.

Fig. 5 is a view of one of the shoes in side elevation showing a thicker liner applied thereto for use in a larger drum.

Fig. 6 is a perspective view showing the peripheral portion of one of the shoes provided with knockout webs.

Figure 7:
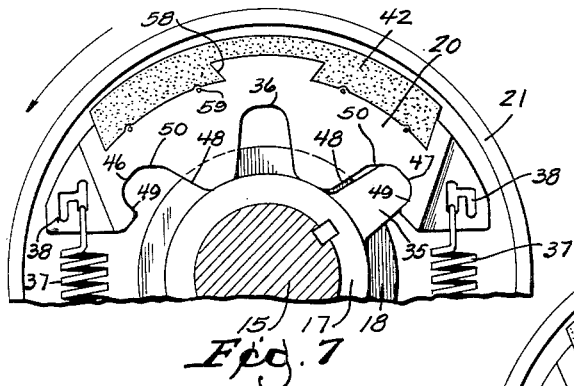
Fig. 7 is a fragmentary view similar to Fig. 1 showing a different assembly of the parts for camming operation.

The shaft 15 comprises the driving member of the assembly. Connected to it by key 16 is the driving hub 17 which has an annular flange at 18 which engages channels 19 in the inner peripheral portions of the segmental shoe 20 to maintain the shoes against axial displacement respecting the shaft.

Encircling the shoes is the drum 21 which projects laterally from the outer periphery of one of the divergent flanges 22 of a driven pulley in which the belt 23 is engaged. Flange 22 is formed in one piece with a tube 24 welded to a bearing sleeve 25 which forms the inner periphery of the pulley. This sleeve is mounted for rotation on the bearing surface 26 of hub 17, being confined against displacement in one direction by shoulder 27 and in the other direction by a snap collar 28 for which the hub is provided with a groove at 29.

The opposing flange 30 of the pulley is likewise provided at its inner periphery with a tubular portion 31 telescopically engaged over tube 24 of flange 22. The tubes may be brazed, welded or otherwise fastened to each other at 33 in any selected position of telescopic adjustment. Thus, if the tube 31 is located near the outer end of tube 24, as in Fig. 2, a relatively wide belt 23 will be accommodated. If tube 31 is moved inwardly over tube 24 before being fastened thereto, as in Fig. 4, the belt 230 will be forced outwardly to a considerably greater radius thereby changing relative speeds.

In addition to the radial flange 18, the hub 17 is provided with a number of arms corresponding to the number of shoes 20. In the designs illustrated by way of exemplifying the invention, there are two shoes 20 and the hub is provided with two arms 35 which may project radially. Each shoe has a radial notch at 36 centered midway between its ends to receive one of the arms 35. The shoes may be connected together at or near their ends by tension springs 37 which are provided with hooks for which the shoes have anchorage slots 38 so designed as to provide alternatively available seats at 39 and 40 for the hooks of respective springs. The anchorages at 39 are less deep than the anchorages at 40, hence maintaining the springs under slightly greater bias than as if the hooks were engaged at anchorages 40.

In the position of the parts shown in Fig. 1, the respective shoes 20 are retracted from engagement with the hub, their respective linings 42 being entirely free of the clutch drum 21. When the driving shaft 15 reaches a speed such that the centrifugal force acting on the respective shoes 20 overcomes the bias of the spring 37, the shoes will move radially outwardly along the radial arms 35 until their linings 42 engage the drum, thereby clutching the driven pulley to shaft 15 to actuate the belt 23. As soon as the shaft 15 drops below the indicated speed at which the clutch is engaged, it will automatically disengage itself, the springs 37 overcoming the centrifugal force acting on the shoes 20 to draw the shoes from the Figure 3 position to that of Figure 1 and disengaging the drive from the shaft to the power output belt.

It will be observed that in addition to the central notches 36 with which the shoes are provided, each shoe is provided with a pair of notches at 46 and 47 which, instead of having radial sides, have side surfaces 48 and 49 which are tangential to shaft 15 and may have cam offsets at 50. Either one of these notches may be the leading end and either may be at the trailing end of the respective shoe, according to the direction of rotation of the driving shaft 15. Assuming that the parts are rotating counterclockwise as indicated in Figs. 7 and 8, the notch 46 will be at the leading end of each shoe 20 while notch 47 will be at the trailing end thereof.

Widely different clutching effects may be secured by engaging the arm 35 of hub 17 in the one notch or the other. Thus, when the parts are organized as shown in Fig. 7, with the arms engaged in the respective trailing notches 47, the arms 35 will have a very definite camming action against the cam surfaces 50 of notches 47 and this will be at the trailing ends of the respective shoes. As soon as the clutch engages, it will be forced into very tight pressure contact with the drum to preclude any possibility of slippage thereafter until the clutch disengages following a reduction in speed of the driving shaft.

Figure 8:
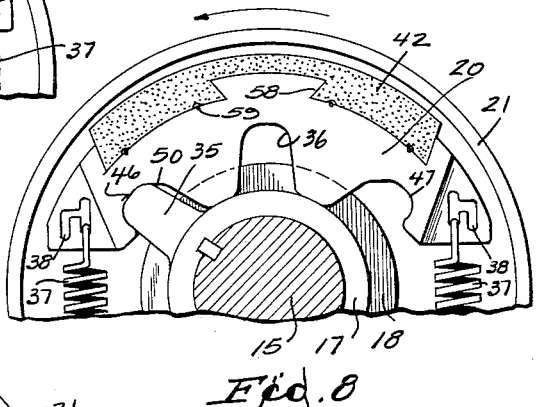
Fig. 8 is a fragmentary view similar to Fig. 1 showing a further modified assembly of the parts for hinged operation of the shoe.

In the organization of Fig. 8, the driving arm 35 is engaged in the notch 46 adjacent the leading end of each shoe 20, and the shoe will tend to be held snugly to the arm at its leading end and to pivot outwardly at its trailing end in response to the centrifugal force to which it is subject. This will give a so called "soft" action which may be designed to permit some slippage in the event the torque to which the clutch is subjected is excessive. Even is no slippage is permitted, the engagement and disengagement of the clutch will be very smooth.

Figure 9:
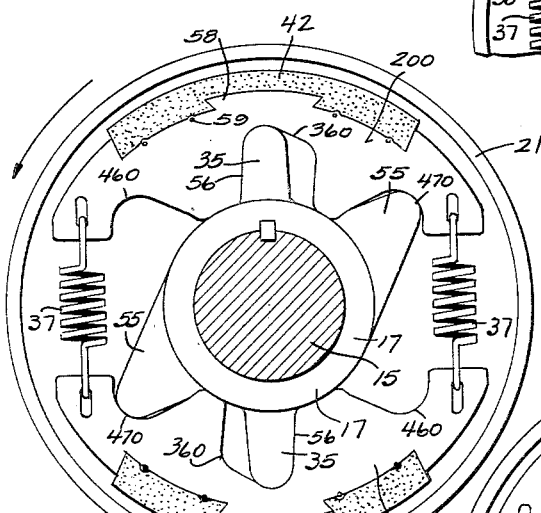
Fig. 9 is a view in end elevation of a modified embodiment showing a multiple armed driver with the shoes disengaged.
Figure 10:
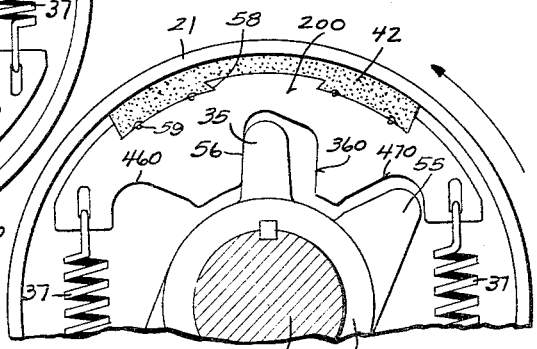
Fig. 10 is a fragmentary view similar to Fig. 9 showing the parts as they appear when the shoes are engaged with the drum.
Figure 11:
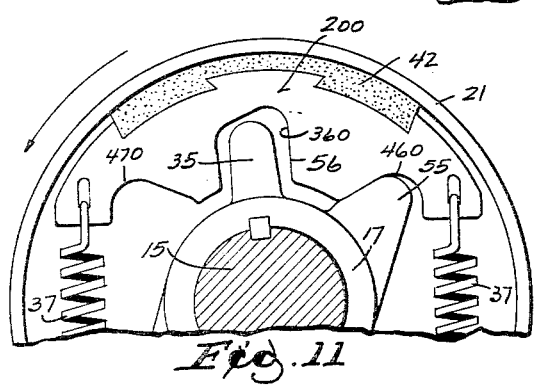
Fig. 11 is a fragmentary view similar to Fig. 10 showing the different action achieved by relative reversal of the shoe respecting the driver.

In the construction shown in Figs. 9 to 11, the driving hub 17 is provided with arms 55 supplementing the arms 35. The central grooves 360 in the respective shoes 200 are broadened rearwardly from the normal positions of arms 35 as clearly appears in each of these views.

The net result of these changes is to give a different action when the shoes are reversed end for end with respect to the hub.

Thus, with the parts assembled as shown in Fig. 9 and Fig. 10, the response of the shoes will be entirely centrifugal because the arms 35 are engaged with the margins 56 of the respective slots 360 at the forward side of each slot in the direction of rotation. The direction of rotation is still assumed to be counterclockwise for convenience in comparison between the several views. Because of the thrust between the arms 35 and the shoe surfaces 56, each shoe will move outward in a radial direction when subjected to centrifugal force. There will neither be the camming action of Fig. 7 nor the hinging action of Fig. 8. The outward movement of the respective shoes will immediately develop thrust between the shoes and the arms 35.

However, if the respective shoes are reversed over the hub so that the asymmetrical grooves 360 are reversed respecting arms 35, clearance will be provided between the shoes and the forward side edges of arms 35 and the thrust between the driving hub 17 and the respective shoes will be developed entirely by arms 55. This will result in the camming action above described with reference to Fig. 7 to produce a more strongly acting clutch without any change whatever in the springs or other structure beyond the mere end for end reversal of the shoes 200.

Whenever it is desired to install any of the various shoes herein disclosed within an oversize drum, it is readily possible to provide the shoe with an oversize brake lining block as shown at 420 in Fig. 5, such lining being receivable into the same dovetailed grooves 58 which accommodate the lining 42 of Figs. 1 and 3.

Moreover, in order that the shoes may be adaptable to various uses and may nevertheless provide integral means of guiding the customer as to the desired assembly, any one of the shoes herein disclosed may be die cast or otherwise manufactured to provide integral knock-out webs 60 spanning the several notches 36, 46, 47 as shown in Fig. 6. The manufacturer assembling such a clutch for particular usage will knock out the webs which initially span the notches into which the propelling arms are intended to be received. Thus, for the organization shown in Figs. 1 and 3, the manufacturer would knock out the webs 60 from grooves 36 of the several shoes. For the usage suggested in Fig. 7, the webs would be left in notches 36 and 46 but would be knocked out of notches 47. For the usage suggested in Fig. 8, the webs would be left to span notches 36 and 47 but would be knocked out of notches 46. For usage suggested in Fig. 9, the webs would be knocked out of notches 360 and 470 but would be left to span the notches 460. For the usage suggested in Fig. 11, the webs would be knocked out of notches 360 and 460 but would be left to span notches 470.

It will be evident that I have provided a structure which, according to its organization, provides many clutches with one set of parts. The camming type of clutch as shown in Fig. 7 and Fig. 11 is quick acting and yields high torque. It is suitable for such usage as chain saws and pumps. The straight centrifugal type of Figs. 1, 3, 9 and 10 is slower acting but smoother and of somewhat lower torque. It is well adapted for use in garden tractors as well as many pumps.

The hinge type of assembly suggested in Fig. 8 is smoother acting and transmits the least total torque. It is well adapted for use in lawn mowers and as a clutch to be built into electric motors for general usage. In any of these, the torque transmitted and the relative speed at which the clutch will engage and disengage can be varied at will by simply adjusting the points of spring connection without making any changes in the spring.

The lining block 42 or 420 is anchored radially by its dovetail interlock with the respective shoes and is held against axial displacement by swedging the metal of the shoe at both sides of the brake lining as indicated, for example, at 59.

The speed at which the shoes will engage the drum or disengage therefrom is controlled, in part, by the tension of the spring and in part by the points at which the springs are connected and in part by the weight of the material from which the shoes 20 or 200 are die cast or otherwise formed.

One feature of the clutch which is of great advantage in some installations consists of the fact that it will operate with a camming action as in Fig. 7 in one direction of rotation and will function with a hinging action as in Fig. 8 if the direction of rotation is reversed without any change whatever in the organization of the parts. It will be evident that if the driving shaft 15 is rotated clockwise rather than counterclockwise, that will be all that will be required to make the device of Fig. 7 operate like that of Fig. 8 and vice versa. If the parts are assembled for straight centrifugal operation as in the organization of Fig. 1, the clutch will operate alike in both directions of rotation.

In summary, therefore, it may be noted that the clutch structure herein disclosed is very versatile, being widely adaptable to different uses notwithstanding that it uses standard parts capable of construction in high volume at low cost to give widely differing results without redesign or re-tooling.

The organization of the clutch within the pulley is also a feature of considerable importance since the assembly is very compact and, with standard flange parts having tubular portions telescopically associated, it is possible to accommodate a wide range of belt sizes or to provide for a wide range of relative speeds of operation according to the spacing at which the pulley parts are assembled by welding or brazing or otherwise.

I claim:

1. In a clutch, the combination with radially spaced inner and outer driving and driven rotors, of clutch means for transmitting torque therebetween and for variably predetermining maximum torque transmission, said clutch means comprising shoes interposed between said rotors, said shoes being of less radial depth than the radial space between the rotors, and being centrifugally movable into peripheral engagement with the outer rotor, means biasing said shoes toward the inner rotor, and a driving arm for each shoe projecting outwardly from the inner rotor and secured thereto, each shoe having a plurality of notches at different points intermediate its ends in which the said arm is loosely and selectively receivable, said notches having arm-engageable thrust surfaces which by reason of their different locations intermediate the ends of the shoe differ from each other as to the effect in pressure engagement of the shoe with the driven rotor when the respective surfaces are engaged by the said arm, the corresponding thrust surfaces of the respective shoes each being engaged by the respective driving arms for such shoes.

2. The device of claim 1 in which the notch of each shoe closest to the end thereof which leads in the rotation of the driven rotor is in the form of a hook and is hooked about the end of the corresponding arm of the driving rotor, whereby each shoe tends to pivot adjacent its leading end about the end of its respective arm.

3. The device of claim 1 in which the driving arm is engaged with the notch adjacent the trailing end of the shoe.

4. The device of claim 1 in which each said shoe has one of its thrust surfaces substantially parallel to a radius of the driving rotor and another of its said thrust surfaces oblique with reference to a radius of the driving rotor whereby radial movement of the shoe propelled by the given driving rotor arm will be substantially solely responsive to the influence of centrifugal force when the substantially radial surface is engaged by such arm and will be partially due to camming action of the arm when the arm is engaged with the surface which is oblique to the radius of the driving rotor.

5. The device of claim 1 in which respective shoes are terminally provided with shoulders at mutually differing distances from each other, the biasing means comprising tension springs connecting said shoes and having portions selectively engageable with respective shoulders for varying the tension to which the shoes are subject.

References Cited in the file of this patent

UNITED STATES PATENTS

| | | |
|---|---|---|
| 1,801,471 | Wersall | Apr. 21, 1931 |
| 1,956,417 | Else | Apr. 24, 1934 |
| 2,024,677 | Bosma | Dec. 17, 1935 |
| 2,613,545 | Reeves | Oct. 14, 1952 |
| 2,703,986 | McCelland | Mar. 15, 1955 |
| 2,718,294 | Armstrong | Sept. 20, 1955 |
| 2,753,967 | Bowers | July 10, 1956 |
| 2,756,856 | Dudley | July 31, 1956 |

FOREIGN PATENTS

| | | |
|---|---|---|
| 393,852 | Germany | July 18, 1924 |
| 245,323 | Great Britain | Jan. 7, 1926 |
| 498,848 | Germany | May 28, 1930 |
| 18,950 of 1934 | Australia | June 17, 1935 |